United States Patent [19]
Saitoh et al.

[11] Patent Number: 5,250,097
[45] Date of Patent: Oct. 5, 1993

[54] METHOD FOR PRODUCING GLASS SOOT DEPOSIT

[75] Inventors: Tatsuhiko Saitoh; Toshio Danzuka, both of Yokohama, Japan

[73] Assignee: Sumitomo Electric Industries Ltd., Osaka, Japan

[21] Appl. No.: 894,426

[22] Filed: Jun. 5, 1992

[30] Foreign Application Priority Data

Jun. 5, 1991 [JP] Japan .................................. 3-134223

[51] Int. Cl.$^5$ .......................................... C03B 37/018
[52] U.S. Cl. .......................................... 65/3.12; 65/12; 65/355
[58] Field of Search .................. 65/3.12, 12, 355, 3.11

[56] References Cited

U.S. PATENT DOCUMENTS

| 4,202,682 | 5/1980 | Black | 65/3.12 X |
| 4,253,863 | 3/1981 | Iyengar | 65/3.12 X |

FOREIGN PATENT DOCUMENTS

| 100931 | 6/1982 | Japan . |
| 61-103433 | 7/1986 | Japan . |
| 162642 | 7/1987 | Japan . |
| 62-162643 | 7/1987 | Japan . |
| 62-171938 | 7/1987 | Japan . |
| 64-37443 | 3/1989 | Japan . |

OTHER PUBLICATIONS

Patent Abstracts of Japan vol. 12, No. 15 (C-469) (2862), 16 Jan. 1988 & JP-A-62 171 938 (Sumitomo Electric Ind. Ltd.) 28 Jul. 1987.

*Primary Examiner*—Robert L. Lindsay
*Attorney, Agent, or Firm*—Cushman, Darby & Cushman

[57] ABSTRACT

A glass soot deposit is produced at a high deposition rate by blowing a gaseous glass-forming raw material together with a fuel gas from a combustion burner in a closed muffle, hydrolyzing the glass-forming raw material in a flame to generate glass soot, and depositing the glass soot on a tip end or a peripheral surface of a starting member which is rotated to form a glass soot deposit, in which a lowest surface temperature of the muffle tube is maintained at 50° C. or higher and an average surface temperature of the muffle is maintained in a range between 50° C. and 150° C., whereby corrosion of the muffle is prevented.

4 Claims, 1 Drawing Sheet

0
METHOD FOR PRODUCING GLASS SOOT DEPOSIT

BACKGROUND OF THE INVENTION

1. Field of the Invention

The present invention relates to a method for producing a glass soot deposit, in particular, a glass preform for use in the fabrication of an optical fiber.

2. Description of the Related Art

In a VAD method which comprises blowing a gaseous glass-forming raw material together with a fuel gas from a combustion burner to form glass soot by a gas phase reaction in a flame and depositing the glass soot on a starting member, environmentally harmful materials such as hydrogen chloride gas are by-products. To trap the harmful materials effectively or eliminate any outside influence on a reaction system, reactions in the VAD method are carried out in an internal space of a closed reactor such as a muffle to deposit the glass soot.

Recently, much research effort has been expended to increase deposition rate, namely synthesis speed of a glass soot deposit per a minute (g/min.) in the VAD method. As an example Japanese Patent Kokai Publication No. 171938/1987 discloses a technique for cooling a muffle tube surface in order to lower the temperature of the glass soot deposit, whereby the deposition efficiency will be increased.

As disclosed in the above Japanese Kokai Publication, the conventional technique for cooling the muffle tube surface decreases the surface temperature to about 20° C.

However, since an oxyhydrogen flame is generated in the muffle tube, the dew point therein is higher than that in the external atmosphere. Therefore, when the muffle tube surface is cooled down to about 20° C., dew condensation occurs in the muffle tube. Since hydrogen chloride gas is generated in the muffle tube, it reacts with water generated by dew condensation to form hydrochloric acid, which corrodes the metal muffle tube. Therefore, the life of the muffle tube is shortened and the corroded metal contaminates the glass soot deposit (preform). Ultimately, when an optical fiber is fabricated from such a contaminated preform, the fiber has increased transmission loss.

SUMMARY OF THE INVENTION

An object of the present invention is to provide a method for producing a glass soot deposit at an improved productivity rate, which avoids the above drawbacks of the conventional cooling technique.

According to the present invention, there is provided a method for producing a glass soot deposit, which comprises steps of:

blowing a gaseous glass-forming raw material together with a fuel gas from a combustion burner in a closed muffle, hydrolyzing said glass-forming raw material in a flame to generate glass soot, and depositing said glass soot on a tip end or a peripheral surface of a starting member which is rotated to form a glass soot deposit, wherein a lowest surface temperature of said muffle is maintained at 50° C. or higher and an average surface temperature of said muffle is maintained in a range between 50° C. and 150° C.

DETAILED DESCRIPTION OF THE INVENTION

Figure 1:
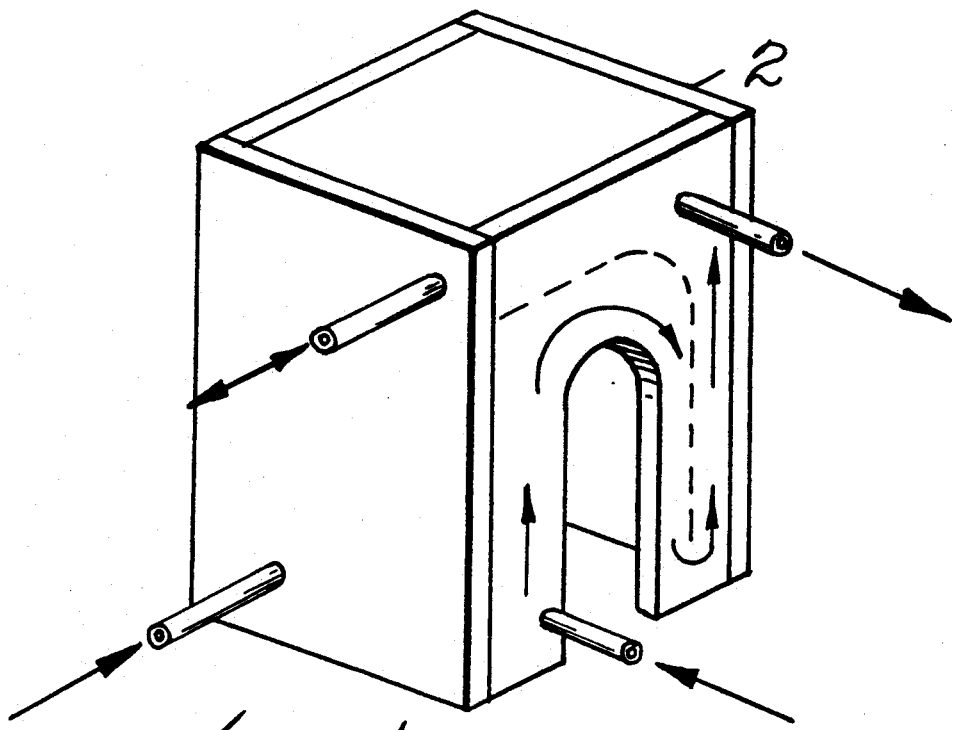
FIG. 1 is a perspective view of an example of a double-wall muffle used in the present invention.
Figure 2:
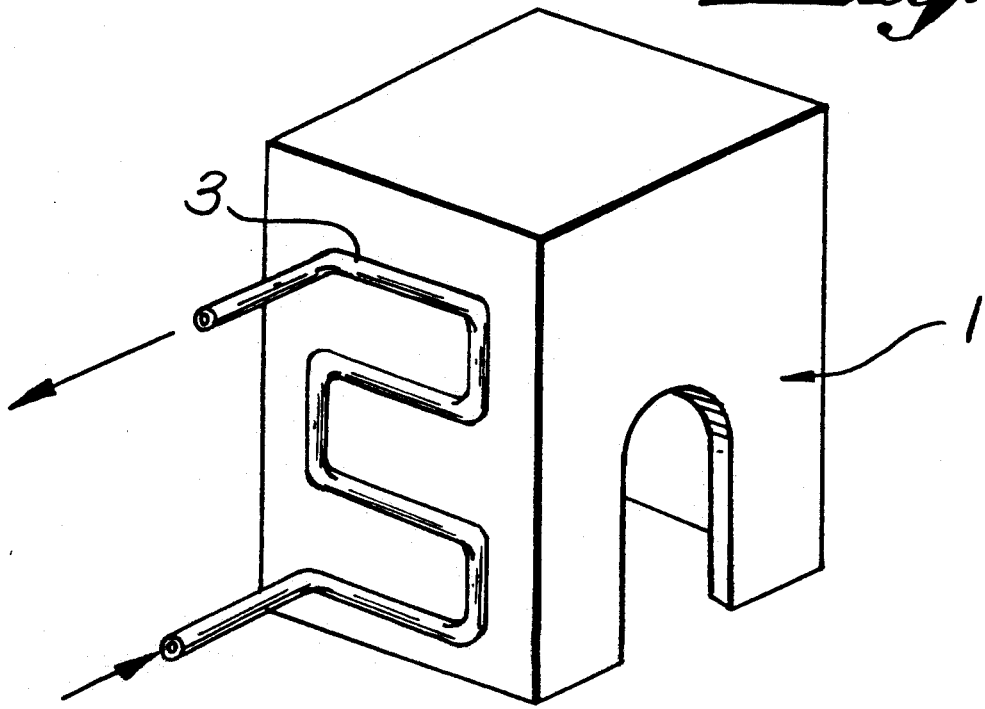
FIG. 2 is a perspective view of an example of a muffle having a cooling pipe.

To maintain the average surface temperature of the muffle 1 in the above range, preferably, the muffle 1 is constructed preferably with double-walls 2, and a cooling liquid maintained at a constant temperature is circulated between the double-walls 2, (see FIG. 1). Alternatively, a cooling pipe 3 is provided on the muffle surface 4 and a cooling liquid maintained at a constant temperature is circulated in the pipe 3 (see FIG. 2).

The glass soot is deposited on the starting member by the thermophoresis effect due to the temperature gradient between the flame (the high temperature side) and the depositing surface (the low temperature side). To increase the thermophoresis effect and the deposition efficiency of the glass soot, the temperature gradient is increased. As one means for increasing the temperature gradient, it is possible to lower the temperature of the depositing surface while the same flame is generated. The temperature of the depositing surface is determined by a balance of the amount of dissipating heat from the depositing surface by radiation, the amount of heat received from the flame and the amount of heat of the muffle 1 by radiation. Therefore, when the amount of heat produced by the muffle 1 is decreased by decreasing the temperature of the muffle tube surface, the temperature of the depositing surface is decreased so that the deposition efficiency of the glass soot is improved.

In the muffle 1, since water is generated by a reaction between hydrogen ($H_2$) and oxygen ($O_2$), a vapor pressure in the muffle 1 is higher than that in the external atmosphere. When the temperature of the muffle wall is cooled to room temperature, for example, 20° C., dew condensation occurs on the muffle wall. As explained above, when dew forms on the muffle 1, the life of the muffle tube is shortened by corrosion, and the corroded metal is splashed and contaminates the glass soot deposit, namely a glass preform. The optical fiber fabricated from such a contaminated preform has large transmission loss.

The dew condensation can be prevented by maintaining the surface temperature of the muffle 1 at a temperature higher than the dew point inside the muffle. However, when the surface temperature of the muffle 1 is raised excessively, the amount of heat radiated from the muffle 1 to the surface of the glass soot deposit increases and then the surface temperature of the glass soot deposit rises. When the surface temperature of the glass soot deposit rises, the thermophoresis effect is decreased so that the deposition efficiency of the glass soot decreases. Therefore, in order to increase the deposition efficiency of the glass soot while preventing dew condensation on the muffle wall, the surface temperature of the muffle 1 is decreased as low as possible insofar as the surface temperature is not lower than the dew point in the muffle 1.

According to the experiments, it has been found that dew condensation occurs when the surface temperature of the muffle 1 is 45° C. or lower. According to a study on the relationship between the deposition rate of glass soot and the average surface temperature of the muffle 1 the deposition rate is substantially constant when the average surface temperature of the muffle is in the range between 50° C. and 150° C.

Accordingly, to increase the deposition rate of the glass soot while preventing dew condensation, the lowest surface temperature of the muffle 1 should be at least 50° C., and the average surface temperature of the muffle 1 in the range between 50° C. and 150° C.

Other conditions for depositing glass soot on the starting member are substantially the same as those in the conventional methods.

PREFERRED EMBODIMENTS OF THE INVENTION

The present invention will be illustrated by the following examples.

COMPARATIVE EXAMPLE 1

A concentric twelve-port burner was used.

From the first port (the center port), a glass-forming raw material ($SiCl_4$) was supplied at a flow rate of 10 liter/min. From each of the second, sixth and tenth ports, hydrogen gas ($H_2$) was supplied at a flow rate of 200 liter/min. From each of the fourth, eighth and twelfth ports, oxygen gas ($O_2$) was supplied at a flow rate of 200 liter/min. From each of the third, fifth, seventh, ninth and eleventh ports, argon was supplied at a flow rate of 40 liter/min. Thereby, a glass soot deposit was produced without cooling the muffle. The temperature of the muffle was between 350° C. and 450° C. (average: 400° C.), the maximum surface temperature of the deposit was 1080° C., and the deposition rate was 16.1 g/min.

COMPARATIVE EXAMPLE 2

A glass soot deposit was produced in the same manner as in Comparative Example 1 except that a water-cooled muffle was used and the muffle temperature was maintained in a range between 10° C. and 100° C. (average: 50° C.). When the muffle temperature was 48° C. or lower, dew condensation occurred and the muffle was corroded. The maximum surface temperature of the deposit was 970° C. and a deposition rate was 17.3 g/min.

EXAMPLE 1

A glass soot deposit was produced in the same manner as in Comparative Example 1 except that a water-cooled muffle was used and the muffle temperature was maintained in the range between 50° C. and 150° C. (average 90° C.). No dew condensation occurred. The maximum surface temperature of the deposit was 990° C. and a deposition rate was 17.1 g/min.

EXAMPLE 2

A glass soot deposit was produced in the same manner as in Comparative Example 1 except that a water-cooled muffle was used and the muffle temperature was maintained in the range between 90° C. and 190° C. (average 140° C.). No dew condensation occurred. The maximum surface temperature of the deposit was 1000° C. and a deposition rate was 17.0 g/min.

As understood from the above results, the deposition rate was smallest in Comparative Example 1 in which the muffle tube was not cooled. In Comparative Example 2, the deposition rate was large but the muffle was corroded. In Examples 1 and 2 according to the present invention, substantially the same deposition rate was achieved as in Comparative Example 2 wherein the muffle tube was cooled to 50° C. Also, in Examples 1 and 2, the corrosion of the muffle tube was prevented. Accordingly, the method of the present invention can increase the deposition rate and prevent the corrosion of the muffle tube.

What is claimed is:

1. A method for producing a glass soot deposit, comprising the steps of:

blowing a gaseous glass-forming raw material together with a fuel gas from a combustion burner in a closed muffle;

hydrolyzing said glass-forming raw material in a flame to generate glass soot; and depositing said glass soot on a tip end or a peripheral surface of a starting member which is rotated to form a glass soot deposit, wherein a lowest surface temperature of said muffle is maintained at 50° C. or higher and an average surface temperature of said muffle is maintained in a range between 50° C. and 150° C.

2. The method according to claim 1, wherein said muffle has a cooling pipe on an outer wall of the muffle and a cooling liquid maintained at a constant temperature is circulated in said cooling pipe.

3. The method according to claim 1, wherein said muffle has a double-wall structure and a cooling liquid maintained at a constant temperature is circulated between the double-walls.

4. A method for producing a glass soot deposit, comprising the steps of:

blowing a gaseous glass-forming raw material together with a fuel gas from a combustion burner in a closed muffle;

adjusting and maintaining interior surface temperature of the muffle at a minimum of 50° C. and at an average in a range between 50° C. and 150° C.;

hydrolyzing said glass-forming raw material in a flame to generate glass soot;

depositing the glass soot on a tip end on a peripheral surface of a starting member; and rotating the starting member to form a glass soot deposit.

* * * * *